(12) United States Patent
Ren et al.

(10) Patent No.: US 8,976,547 B2
(45) Date of Patent: Mar. 10, 2015

(54) SWITCHING MODE POWER SUPPLY WITH SYNCHRONOUS RECTIFYING CONTROL CIRCUIT

(75) Inventors: Yuancheng Ren, Hangzhou (CN); Lei Miao, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 303 days.

(21) Appl. No.: 13/478,575

(22) Filed: May 23, 2012

(65) Prior Publication Data

US 2012/0300520 A1 Nov. 29, 2012

(30) Foreign Application Priority Data

May 24, 2011 (CN) .......................... 2011 1 0135036

(51) Int. Cl.
*H02M 3/335* (2006.01)
(52) U.S. Cl.
CPC ........ *H02M 3/33592* (2013.01); *Y02B 70/1475* (2013.01)
USPC ...................................... 363/21.14
(58) Field of Classification Search
CPC .... H02M 3/33592; H02M 7/42; H02M 11/00
USPC ..................... 363/21.14, 21.18, 41
See application file for complete search history.

(56) References Cited

U.S. PATENT DOCUMENTS

| 8,102,680 B2 | 1/2012 | Ren et al. | |
| 2008/0002441 A1* | 1/2008 | Allinder | 363/21.14 |
| 2009/0129125 A1* | 5/2009 | Yang | 363/21.14 |

OTHER PUBLICATIONS

U.S. Appl. No. 13/251,067, Joseph.

* cited by examiner

*Primary Examiner* — Adolf Berhane
*Assistant Examiner* — Yemane Mehari
(74) *Attorney, Agent, or Firm* — Perkins Coie LLP

(57) ABSTRACT

A switching mode power supply comprising a synchronous rectifying control circuit. The synchronous rectifying control circuit comprising an integrating circuit, a first comparison circuit and a logic circuit. The integrating circuit is configured to provide an integrating signal. The first comparison circuit comprises a first input coupled to the output of the integrating signal, a second input configured to receive a first threshold signal, and an output. The logic circuit comprises a first input coupled to the output of the first comparison circuit and an output coupled to a control terminal of the secondary switch, and the secondary switch is configured to be turned OFF when the integrating signal is less then the first threshold signal.

20 Claims, 13 Drawing Sheets

SWITCHING MODE POWER SUPPLY WITH SYNCHRONOUS RECTIFYING CONTROL CIRCUIT

CROSS-REFERENCE TO RELATED APPLICATION(S)

This application claims the benefit of CN application No. 201110135036.7, filed on May 24, 2011, and incorporated herein by reference.

TECHNICAL FIELD

This invention relates generally to electrical circuits, and more particularly but not exclusively to switching mode power supply and synchronous rectifying control method thereof.

BACKGROUND

Recently, with the development of electrical technology, low voltage and high current applications are widely used. Low voltage operation helps to reduce power loss, but also raises new challenge to power supply.

There are three main components, i.e., power switch, transformer and rectifying diode, contributed to power loss for a switching mode power supply. A voltage drop on the rectifying diode is relatively high at low voltage applications. As a result, power loss introduced by the rectifying diode is relatively large. For example, voltage drop on a fast recovery diode (FRD) or an ultra-fast recovery diode (SRD) may be about 1.0V-1.2V, and voltage drop on a schottky diode may be about 0.6V.

Synchronous rectification is a technology for reducing power loss on rectifying device and improving efficiency by replacing rectifying diode with power metal oxide semiconductor field-effect transistor (MOSFET). Generally speaking, on-resistance Rds(on) of MOSFET is relatively low to improve efficiency of switching mode power supply at low voltage applications and there is no dead zone introduced by schottky barrier voltage. MOSFET is a voltage controlled device and MOSFET has a linear voltage-current characteristic when turned ON. Gate voltage of a rectifying MOSFET needs to be in phase with a rectified voltage for synchronous rectification.

Traditional control methods for synchronous rectification adopt discrete self-driven, single-chip phase-locked loop and smart rectifier. Disadvantages of discrete self-driven method for synchronous rectification are slow response and low system reliability. Single-chip phase-locked loop for synchronous rectification is configured to control on/off of the rectifying MOSFET based on signal at primary side. Disadvantage of single-chip phase-locked loop method for synchronous rectification is low reliability in burst mode, i.e., when light load or no load occurs. The best method is smart rectifier method, which is independent on signal at primary side. Smart rectifier method detects voltage drop on the rectifying MOSFET directly and has quick response.

FIG. 1 shows waveforms illustrating signals of traditional smart rectifier. Take a switching mode power supply comprising a transformer as an example. As shown in FIG. 1, a drain-source voltage Vds of a rectifying switch, a current signal Isec indicating current flowing from the secondary winding to a load, and a drive signal DRV of the rectifying switch are illustrated. Drain-source voltage Vds is employed to compare with a threshold signal Vth1 and a threshold signal Vth2. When a body diode of the rectifying switch is turned ON, drain-source voltage Vds decreases rapidly. If drain-source voltage Vds decreases less than threshold signal Vth2, the rectifying switch will be turned ON. If drain-source voltage Vds rises larger than threshold signal Vth1, the rectifying switch will be turned OFF.

A disadvantage of traditional smart rectifier is that shoot-through may occur under some conditions. For example, per characteristics of the rectifying switch and/or delay of a control circuit, after drain-source voltage Vds rises up to threshold Vth1, there may be a turn OFF delay time period to turn OFF the rectifying switch and there may be a residual current transferring from a secondary winding to a primary winding. If the turn OFF delay time period is long, the rectifying switch may be not turned OFF in time, and the rectifying switch and a switch at primary side may be turned ON at the same time. As a result, shoot-through occurs and the switching mode power supply is under the danger of broken down.

Thus, an improved synchronous rectifying control method is needed.

SUMMARY

It is an object of the present disclosure to provide an improved switching mode power supply, a synchronous rectifying control circuit and a synchronous rectifying control method thereof.

In one embodiment, a synchronous rectifying control circuit for a switching mode power supply is disclosed. The switching mode power supply may comprise a transformer having a primary winding and a secondary winding, a primary circuit, and a secondary switch. The synchronous rectifying control circuit having an output coupled to a control terminal (gate) of the secondary switch may comprise an integrating circuit, a first comparison circuit and a logic circuit, wherein the integrating circuit has a first input, a second input and an output, the first input may be coupled to a first terminal of the secondary winding, the second input may be coupled to a second terminal of the secondary winding, and the output may be configured to provide an integrating signal via integrating a voltage across the secondary winding, wherein the first comparison circuit has a first input, a second input and an output, the first input may be coupled to receive the integrating signal, the second input may be coupled to receive a first threshold signal, and the output may be configured to provide a first comparing signal via comparing the integrating signal with the first threshold signal, and wherein the logic circuit has a first input and an output, the first input may be coupled to the output of the first comparison circuit, and the output may be coupled to the control terminal of the secondary switch to provide a drive signal.

In one embodiment, a switching mode power supply comprising a primary circuit, a transformer, a secondary switch and a synchronous rectifying control circuit is disclosed. The primary circuit may comprise an input configured to receive an input signal and an output configured to provide an alternating current (AC) signal. The transformer may comprise a primary winding coupled to the output of the primary circuit and a secondary winding. The secondary switch may comprise a control terminal, a first terminal coupled to the secondary winding and a second terminal coupled to a load. The synchronous rectifying control circuit may comprise an output coupled to the control terminal of the secondary switch to provide a drive signal.

In one embodiment, a synchronous rectifying control method for a switching mode power supply is disclosed. The switching mode power supply may comprise a transformer having a primary winding and a secondary winding, and a secondary switch at secondary side. The synchronous rectifying control method may comprise: providing an integrating signal by integrating a voltage across the secondary winding; comparing the integrating signal with a first threshold signal and providing a first comparing signal; and turning OFF the secondary switch based on the first comparing signal.

In one embodiment, in steady state, the integrating signal within a switching period may be zero volts per volt-seconds balance of the transformer. The secondary switch may be turned OFF when the integrating signal is less than the first threshold signal. As a result, the secondary switch may be turned OFF before a primary switch is turned ON to avoid shoot-through.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Several embodiments of the present invention are described below with reference to switching mode power supply, synchronous rectifying control circuit and associated synchronous rectifying control method. As used hereinafter, the term "couple" generally refers to multiple ways including a direct connection with an electrical conductor and an indirect connection through intermediate diodes, resistors, capacitors, and/or other intermediaries. The term "switch" generally refers to a semiconductor device composed of semiconductor material with at least three terminals for connection to an external circuit. The term "primary system ground" generally refers to a system ground at primary side. The term "secondary system ground" generally refers a system ground at secondary side.

Figure 1:
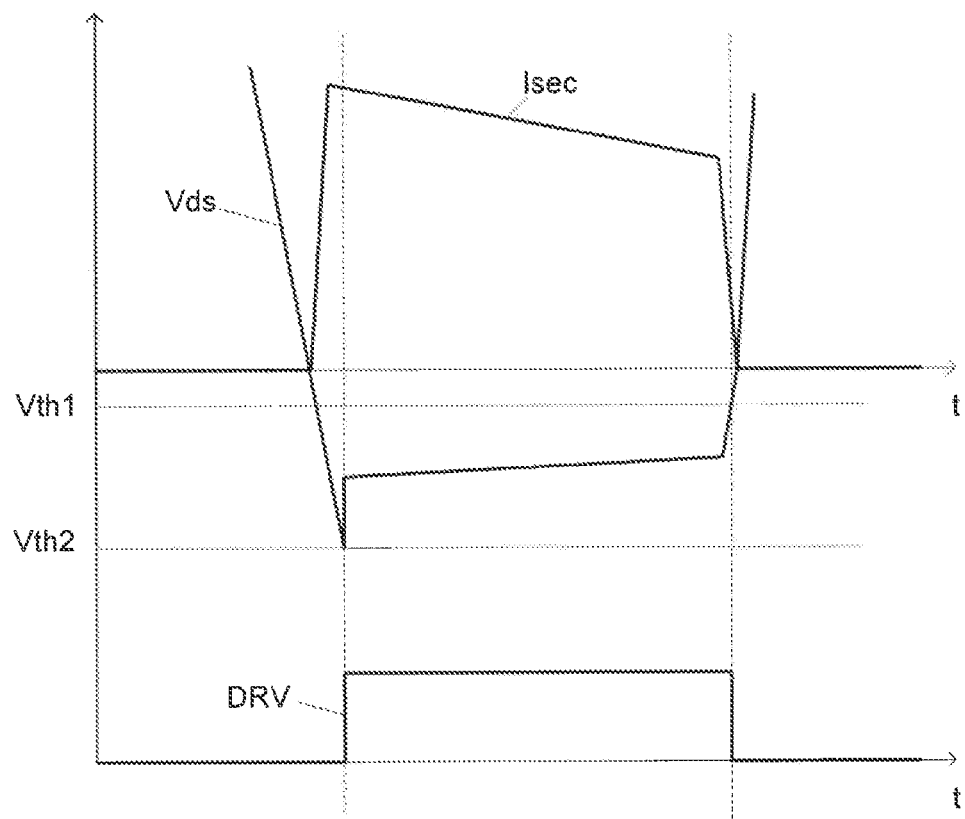
FIG. 1 shows waveforms illustrating signals of traditional smart rectifier.
Figure 2:
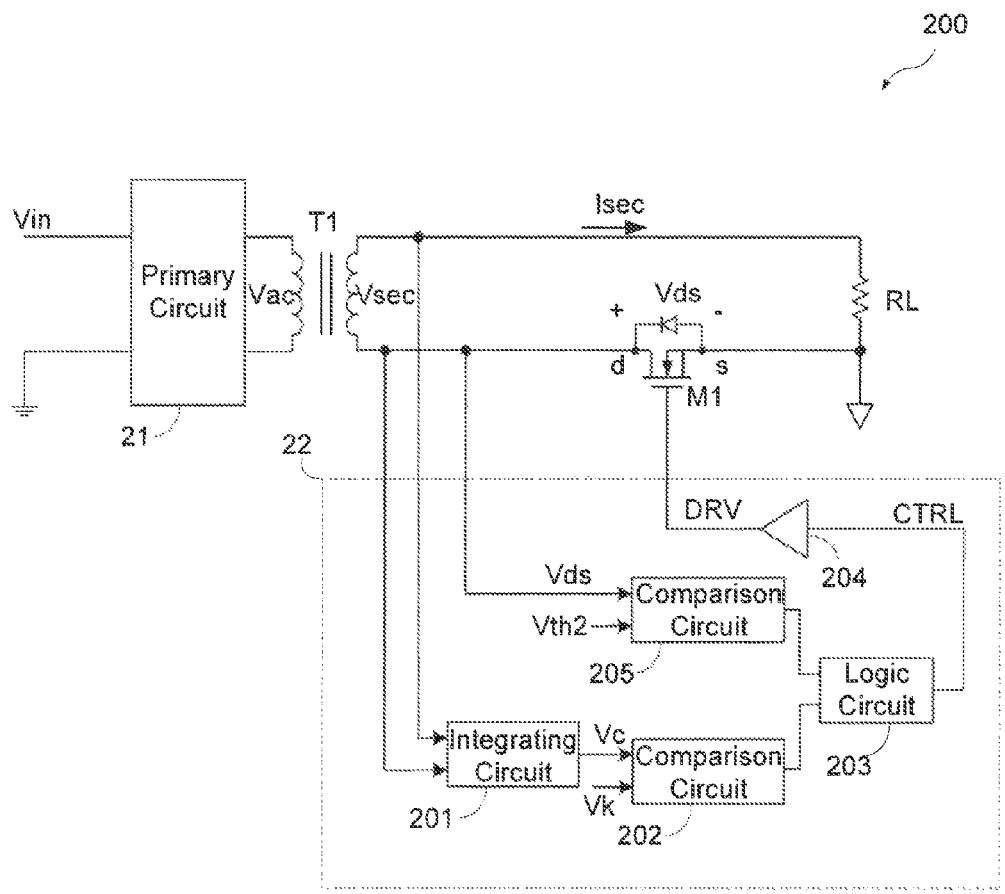
FIG. 2 illustrates a block diagram of a switching mode power supply in accordance with an embodiment of the present invention.

FIG. 2 illustrates a block diagram of a switching mode power supply 200 in accordance with an embodiment of the present invention. Switching mode power supply 200 comprises a primary circuit 21, a transformer T1, a secondary switch M1 and a synchronous rectifying control circuit 22. Secondary switch M1 is employed as a rectifying switch. Primary circuit 21 is configured to receive an input signal Vin, and provide an alternating current (AC) signal Vac. In one embodiment, primary circuit 21 may be a direct current to alternating current (DC/AC) circuit, or an AC/AC circuit. In one embodiment, flyback converter, forward converter, half-bridge converter, full-bridge converter, resonant converter and any other suitable topology may be employed as primary circuit 21. Transformer T1 comprises a primary winding and a secondary winding. Primary circuit 21 is placed at primary side of transformer T1 and primary circuit 21 is coupled to the primary winding of transformer T1 to provide AC signal Vac. Secondary switch M1 is placed at secondary side of transformer T1 and secondary switch M1 comprises a first terminal, a second terminal and a control terminal. In one embodiment, the first terminal of secondary switch M1 is coupled to one terminal of the secondary winding of transformer T1, the second of secondary switch M1 is coupled to one terminal of a load RL, the other terminal of load RL is coupled to the other terminal of the secondary winding of transformer T1, and the control terminal of secondary switch M1 is coupled to the synchronous rectifying control circuit to receive a drive signal DRV. In one embodiment, the first terminal of secondary switch M1 comprises drain, and the second terminal of secondary switch M1 comprises source. In another embodiment, the first terminal of secondary switch M1 comprises source, and the second terminal of secondary switch M1 comprises drain.

In one embodiment as shown in FIG. 2, secondary switch M1 is an N channel metal oxide semiconductor field effect transistor (MOSFET). In another embodiment, secondary switch M1 may be a P channel MOSFET. In one embodiment, a half wave rectifier comprising secondary switch M1 may be employed, drain of secondary switch 111 may be coupled to a bottom terminal of the secondary winding, and source of secondary switch M1 may be coupled to the secondary system ground. In another embodiment, source of secondary switch M1 may be coupled to a top terminal of the secondary winding, and drain of secondary switch M1 may be coupled to the secondary system ground through load RL. In one embodiment, a full wave rectifier or a full bridge rectifier comprising more than one secondary switch i.e., rectifying switch, may be employed. In one embodiment, transformer T1 may comprise more than one secondary winding, and each secondary winding may be coupled to a respective secondary switch.

Synchronous rectifying control circuit 22 comprises an integrating circuit 201, a comparison circuit 202, a logic circuit 203. Synchronous rectifying control circuit 22 may comprise a driving circuit 204. Integrating circuit 201 is coupled to the secondary winding to receive a voltage Vsec across the secondary winding and has an output configured to provide an integrating signal Vc. In one embodiment, the bottom terminal of the secondary winding is defined as positive terminal of voltage Vsec, and the top terminal of the secondary winding is defined as negative terminal of voltage Vsec. In one embodiment, integrating circuit 201 comprises a first input coupled to the top terminal of the secondary winding, and a second input coupled to the bottom terminal of the secondary winding. Comparison circuit 202 comprises a first terminal coupled to the output of integrating circuit 201 to receive integrating signal Vc, a second terminal configured to receive a threshold signal Vk, and an output configured to provide a first comparing signal via comparing integrating signal Vc with threshold signal Vk. Logic circuit 203 comprises an input coupled to the output of comparison circuit 202, and an output configured to provide a control signal CTRL to turn ON or turn OFF secondary switch M1, Logic circuit 203 is configured to turn OFF secondary switch M1 responsive to the first comparing signal. Driving circuit 204 comprises an input coupled to the output of logic circuit 203 to receive control signal CTRL, and an output configured to provide a drive signal DRV to the control terminal of secondary switch M1.

In steady state, voltage of integrating signal Vc within a switching period Tsw should be zero volts per volt-seconds balance characteristics (Ldi/dt=u) of transformer T1, i.e., integrating signal Vc at time t should equal integrating signal Vc at time t+nTsw, where n is an integer. Primary circuit 21 may comprise a primary switch at primary side. Secondary switch M1 is configured to be turned OFF when the primary switch is turned ON, otherwise secondary switch M1 is configured to be turned ON when the primary switch is turned OFF. In one embodiment, primary circuit 21 may comprise a plurality of primary switches at primary side. In one embodiment, integrating signal Vc equals a value INT when the primary switch is turned ON, and secondary switch M1 is configured to be turned OFF before integrating signal Vc equals the value INT to make sure that secondary switch M1 is turned OFF before the primary switch is turned ON to avoid shoot-through.

In one embodiment, when secondary switch M1 is turned OFF, voltage Vsec is positive (Vsec >0), i.e., voltage at the bottom terminal of the secondary winding is higher than voltage at the top terminal of the secondary winding, integrating signal Vc increases gradually. Otherwise, when secondary switch M1 is turned ON, voltage Vsec is negative (Vsec <0), i.e., voltage at the bottom terminal of the secondary winding is lower than voltage at the top terminal of the secondary winding, integrating signal Vc decreases gradually. When integrating signal Vc is less than threshold signal Vk, secondary switch M1 is turned OFF via logic circuit 203. In another embodiment, when secondary switch M1 is turned OFF, voltage Vsec is negative (Vsec <0), integrating signal Vc decreases gradually. Otherwise, when secondary switch M1 is turned ON, voltage Vsec is positive (Vsec >0), integrating signal Vc increases gradually. When integrating signal Vc is less than threshold signal Vk, secondary switch M1 is turned OFF via logic circuit 203.

In one embodiment, switching mode power supply 200 further comprises a comparison circuit 205. Comparison circuit 205 is configured to receive a drain-source voltage Vds of secondary switch M1 and a threshold signal Vth2, e.g., −500 mV, and provide a second comparing signal via comparing drain-source voltage Vds with threshold signal Vth2. Logic circuit 203 is further configured to receive the second comparing signal, and is configured to turn ON secondary switch 111 accordingly. In one embodiment, when drain-source voltage Vds is less than threshold signal Vth2, and integrating signal Vc is larger than threshold signal Vk, secondary switch M1 is configured to be turned ON via logic circuit 203.

Figure 3:
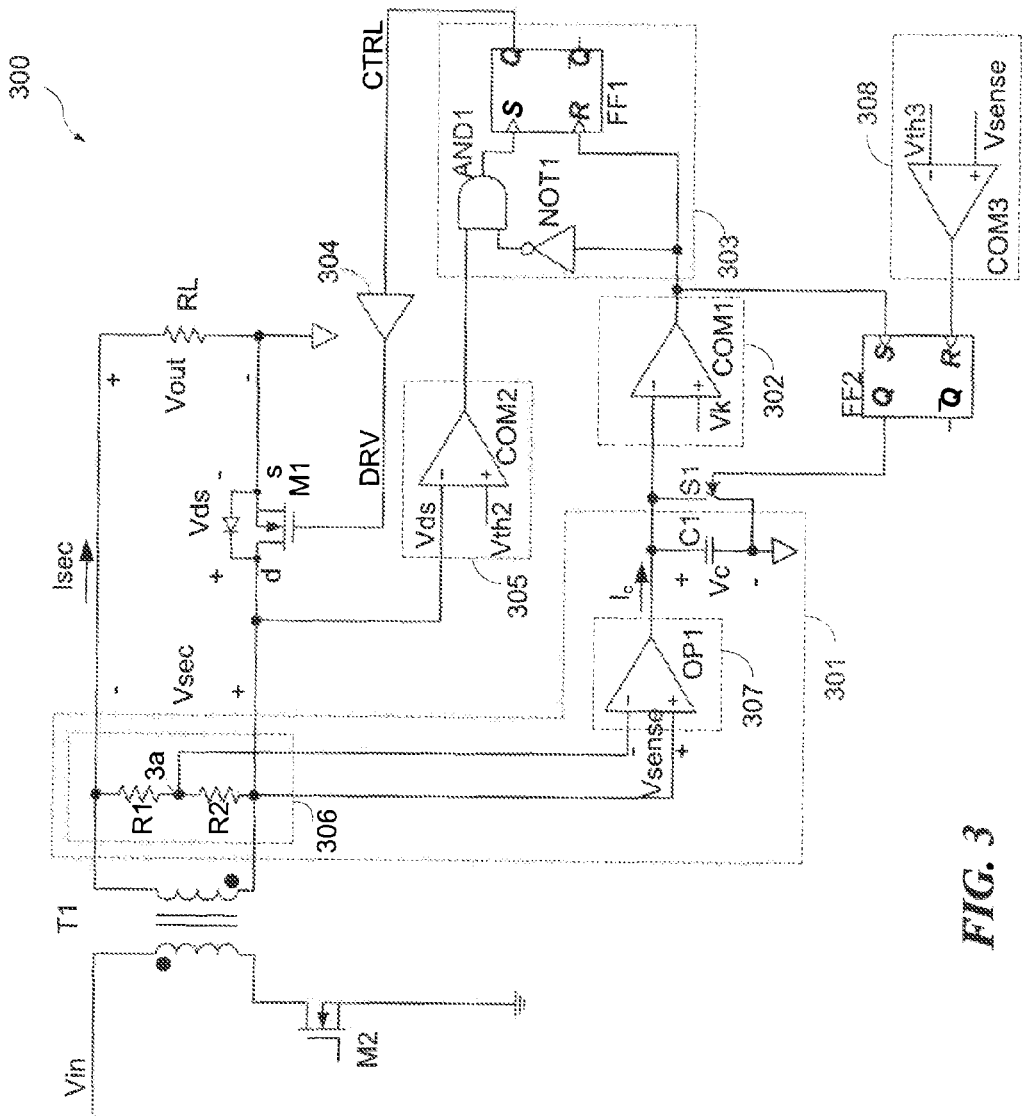
FIG. 3 schematically illustrates a switching mode power supply in accordance with an embodiment of the present invention.

FIG. 3 schematically illustrates a switching mode power supply 300 in accordance with an embodiment of the present invention. In one embodiment, flyback topology is employed as one example as shown in FIG. 3. Switching mode power supply 300 comprises a primary switch M2 at primary side, transformer T1, secondary switch M1 at secondary side and a synchronous rectifying control circuit. In one embodiment, drain of primary switch M2 is coupled to a bottom terminal of the primary winding and source of primary switch M2 is coupled to a primary system ground at primary side. In one embodiment, drain of secondary switch M1 is coupled to a bottom terminal of the secondary winding and source of secondary switch M1 is coupled to the secondary system ground. Synchronous rectifying control circuit may comprise an integrating circuit 301, a comparison circuit 302, a logic circuit 303 and a driving circuit 304.

Integrating circuit 301 comprises a voltage sampling circuit 306, a voltage to current conversion circuit 307, and a capacitor C1. Voltage sampling circuit 306 is coupled to the top terminal and the bottom terminal of the secondary winding to receive voltage Vsec, and voltage sampling circuit 306 is configured to provide a voltage sampling signal Vsense. Voltage to current conversion circuit 307 is configured to receive voltage sampling signal Vsense. Voltage to current conversion circuit 307 may comprise an output configured to provide a current signal Ic based on voltage sampling signal Vsense. Capacitor C1 is coupled to the output of voltage to current conversion circuit 307 to receive current signal Ic. In one embodiment, a first end of capacitor C1 is coupled to the output of voltage to current conversion circuit 307, and a second end of capacitor C1 is coupled to the secondary system ground. As a result, capacitor C1 is configured to be charged and discharged via current signal Ic and voltage at the first end of capacitor C1 is integrating signal Vc.

In one embodiment, voltage sampling circuit 306 comprises a voltage divider comprising a resistor R1 and a resistor R2. In one embodiment, a first end of resistor R1 is coupled to the top terminal of the secondary winding, a second end of resistor R1 is coupled to a first end of resistor R2 at node 3a, and a second end of resistor R2 is coupled to the bottom terminal of the secondary winding. Voltage between the second end of resistor R2 and node 3a is employed as voltage sampling signal Vsense. Voltage to current conversion circuit 307 comprises a transconductance amplifier OP1. Transconductance amplifier OP1 comprises an inverting terminal coupled to node 3a, a non-inverting terminal coupled to the second end of resistor R2 and an output configured to provide current signal Ic. The first end of capacitor C1 is coupled to the output of transconductance amplifier OP1, and the second end of capacitor C1 is coupled to the secondary system ground. In one embodiment, voltage to current conversion circuit 307 may be a voltage controlled current source.

Comparison circuit 302 comprises a first terminal coupled to the output of transconductance amplifier OP1, a second input terminal configured to receive threshold signal Vk, and an output. In one embodiment, comparison circuit 302 comprises a comparator COM1 having an inverting terminal coupled to the output of transconductance amplifier OP1, a non-inverting terminal configured to receive threshold signal Vk, and an output. The synchronous rectifying control circuit may further comprise a comparison circuit 305. Comparison circuit 305 comprises a comparator COM2 having an inverting terminal configured to receive drain-source voltage Vds of secondary switch M1, a non-inverting terminal configured to receive threshold signal Vth2 and an output.

Logic circuit 303 may comprise a NOT gate NOT1, an AND gate AND1 and a RS trigger FF1. NOT gate NOT1 comprises an input coupled to the output of comparator COM1 and an output. AND gate AND1 comprises a first input coupled to the output of comparator COM2, a second input coupled to the output of NOT gate NOT1 and an output. RS trigger FF1 comprises a set terminal S coupled to the output of AND gate AND1, a reset terminal R coupled to the output of comparator COM1, and an output. Driving circuit 304 comprises an input coupled to the output of RS trigger FF1, and an output configured to provide drive signal DRV coupled to gate of secondary switch M1.

In one embodiment, when integrating signal Vc is less than threshold signal Vk, capacitor is discharged to about zero volts. Integrating signal Vc is discharged until primary switch M2 is turned ON and an output signal Vout or voltage Vsec is increased larger than a threshold signal. As a result, integrating signal Vc is about zero volts when primary switch M2 is about to be turned ON, and it is easy to choose value of threshold signal Vk. For example, threshold signal Vk is a little larger than zero volts.

In one embodiment, the synchronous rectifying control circuit may further comprise a switch S1 and a comparison circuit 308. Comparison circuit 308 having a first terminal configured to receive voltage sampling signal Vsense, a second terminal configured to receive a threshold signal Vth3, and an output. Switch S1 comprises a first terminal coupled to the first end of capacitor C1, a second terminal coupled to the second end of capacitor C1, and a control terminal coupled to the output of comparison circuit 308 and the output of comparison circuit 302. Switch S1 is turned on when integrating signal Vc is less than threshold signal Vk and switch S1 is turned OFF when voltage sampling signal Vsense is larger then threshold signal Vth3.

In one embodiment, the synchronous rectifying control circuit may further comprise a RS trigger FF2. In one embodiment, comparison circuit 308 comprises comparator COM3 having an inverting terminal configured to receive threshold signal Vth3, a non-inverting terminal configured to receive voltage sampling signal Vsense, and an output coupled to the output of comparison circuit 308. RS trigger FF2 comprises a set terminal S coupled to the output of comparator COM1, a reset terminal R coupled to the output of comparator COM3, and an output coupled to the control terminal of switch S1. When integrating signal Vc is decreased less than threshold signal Vk, secondary switch M1 is turned OFF, and switch S1 is turned ON to discharge capacitor C1. Integrating signal Vc then is decreased to about zero volts until primary switch M2 is turned ON and voltage sampling signal Vsense is larger than threshold signal Vth3. In one embodiment, when capacitor C1 is discharged to about zero volts, the output of transconductance amplifier OP1 is disconnected with the first end of capacitor C1 to avoid long period short circuit of transconductance amplifier OP1.

Figure 4:
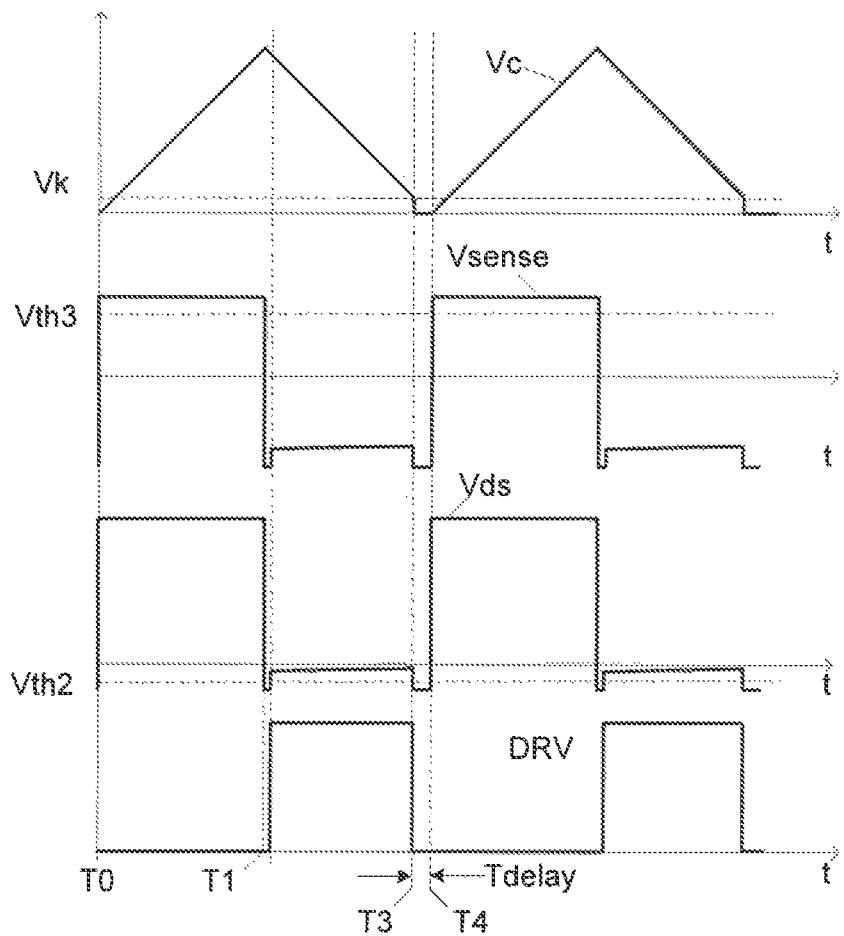
FIG. 4 shows waveforms illustrating signals of the switching mode power supply shown in FIG. 3 in accordance with an embodiment of the present invention.

FIG. 4 shows waveforms illustrating signals of the switching mode power supply 300 shown in FIG. 3. When primary switch M2 is turned ON at time T0, secondary switch M1 and its body diode are turned OFF, and voltage Vsec equals n*Vin which is positive, where n is a turns ratio between the primary winding and the secondary winding. Voltage sampling signal Vsense is positive and larger than threshold signal Vth3, capacitor C1 is charged via current signal Ic, and integrating signal Vc increases gradually. Drain-source voltage vds is positive and may be represented by an equation: Vds=Vsec+Vout. When primary switch M2 is turned OFF at time T1, voltage Vsec becomes negative, the body diode of secondary switch M1 is turned ON, drain-source voltage vds decreases to negative and less than threshold signal Vth2, Then secondary switch M1 is turn ON at time 12 via drive signal DRV, drain-source voltage vds is negative and may be represented by an equation: Vds=Isec*Rdson, where Rdson is a on-resistance of secondary switch M1, and Isec is a current flowing from the bottom terminal to the top terminal of the secondary winding. During time period 12 to T3, secondary switch M1 is turned ON, signal Vsec and voltage sampling signal Vsense is negative, capacitor C1 is discharged via current signal Ic, and integrating signal Vc decreases gradually. When integrating signal Vc decreases less than threshold signal Vk at time T3, secondary switch M1 is turned OFF, and capacitor C1 is discharged via switch S1, and integrating signal Vc is discharged to about zero volts until primary switch M2 is turned ON at time T4.

Per positive threshold signal Vk, there is a delay time period Tdelay from secondary switch M1 is turned OFF at time T3 to primary switch M2 is turned ON to avoid shoot-through. During delay time period Tdelay, secondary switch M1 and primary switch M2 are turned OFF, and the body diode of secondary switch M1 is turned ON for free-wheeling. Delay time period Tdelay may have influence on both reliability and efficiency. If delay time period Tdelay is too short, shoot-through between secondary switch M1 and primary switch M2 may occurs to damage switching mode power supply 300. Otherwise, if delay time period Tdelay is too long, then a time period for free-wheeling via the body diode of secondary switch M1 may be too long to receive high efficiency for switching mode power supply 300.

Figure 5:
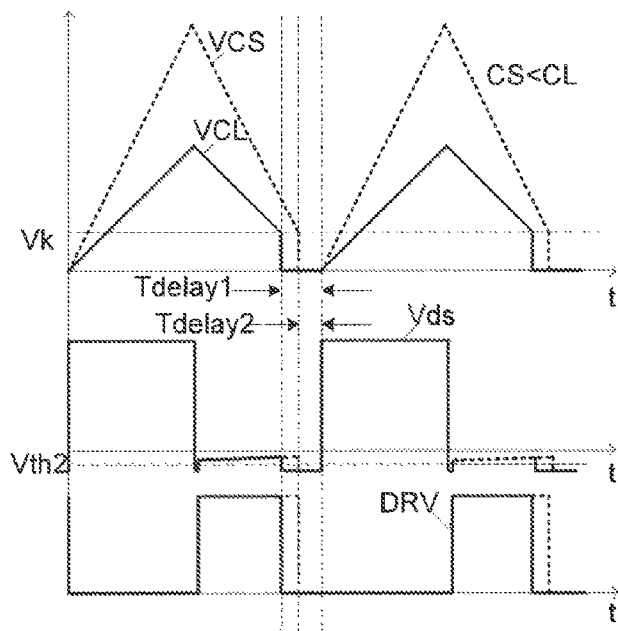
FIG. 5 shows waveforms illustrating signals with different capacitance of integrating capacitor of the switching mode power supply shown in FIG. 3 in accordance with an embodiment of the present invention.

Delay time period Tdelay is related with capacitor C1, threshold signal Vk, input signal Vin, output signal Vout, drain-source voltage vds, and a leakage inductance of transformer T1. FIG. 5 shows waveforms illustrating signals with different capacitance of capacitor C1 of the switching mode power supply shown in FIG. 3. Integrating signal VCS indicates an integrating signal introduced by capacitance CS of capacitor C1, and integrating signal VCL indicates an integrating signal introduced by capacitance CL of capacitor. As shown in FIG. 5, capacitance CS is less than capacitance CL, and an increasing and decreasing slope of integrating signal VCS is larger than integrating signal VCL. A delay time period Tdelay1 corresponding to capacitance CL is longer than a delay time period Tdelay2 corresponding to capacitance CS.

In one embodiment, when primary switch M2 is turned ON, voltage Vsec is n*Vin, and when primary switch M2 is turned OFF, voltage Vsec is Vds-Vout. In one embodiment, volt-seconds balance of transformer T1 may be disturbed at some conditions, such as during start up of switching mode power supply, load transient, varying of input signal Vin and varying of output signal Vout, as a result, primary switch may be turned ON before integrating signal Vc decreases to less than threshold signal Vk, i.e., before secondary switch M1 is turned OFF, and then shoot-through between primary switch M2 and secondary switch M1 may occur.

Figure 6:
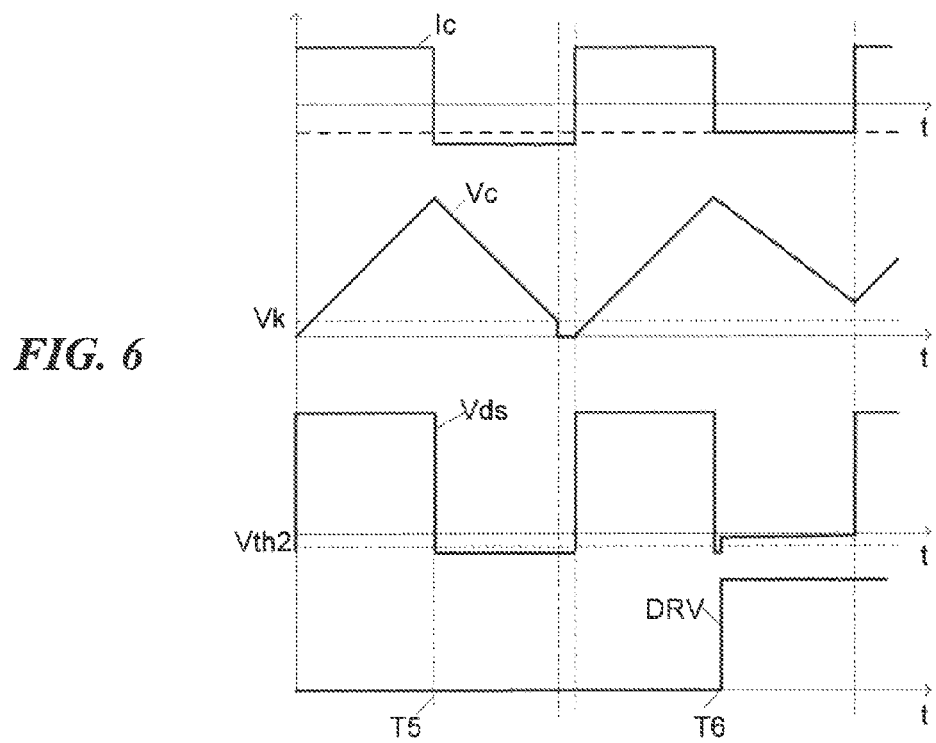
FIG. 6 shows waveforms illustrating signals of a switching mode power supply during start up in accordance with an embodiment of the present invention.

FIG. 6 shows waveforms illustrating signals of a switching mode power supply 300 during start up in accordance with an embodiment of the present invention. During start up of switching mode power supply 300, the synchronous rectifying control circuit has not entered into normal operation. The body diode of secondary switch M1 is turned ON when primary switch M2 is turned OFF. Though voltage Vds is less than threshold signal Vth2 at time T5, secondary switch M1 may be not turned ON per the synchronous rectifying control circuit has not been prepared, e.g., driving circuit 304 has not been prepared to provide effective drive signal DRV, and the body diode of secondary switch M1 keeps turned ON until primary switch M2 is turned ON. After the synchronous rectifying control circuit is ready, secondary switch M1 may be turned ON when voltage Vds is less than threshold signal Vth2 at time T6, and the falling slope of integrating signal Vc may be lower to disturb volt-seconds balance of transformer T1. In one embodiment, primary switch M2 may be turned ON before integrating signal Vc decreases less than threshold signal Vk, and shoot-through between primary switch M2 and secondary switch M1 may occur.

Figure 7:
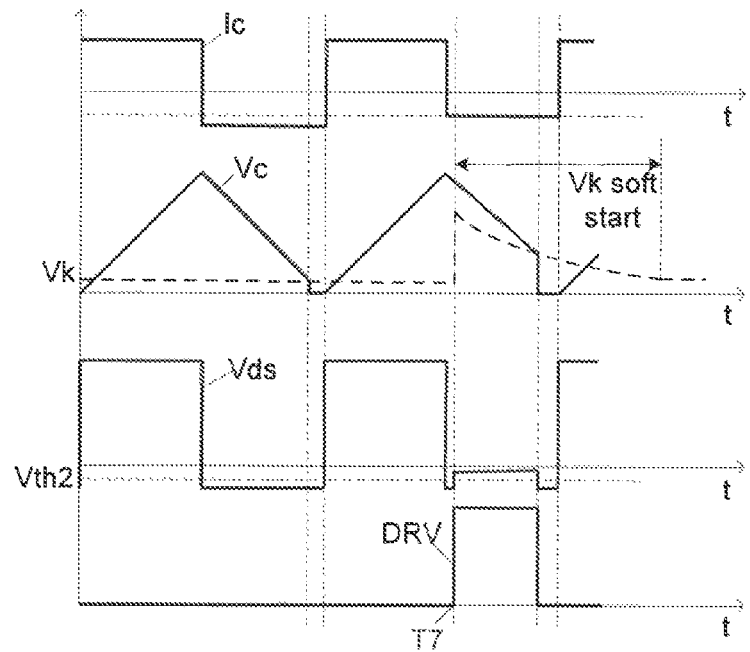
FIG. 7 shows waveforms illustrating signals of a switching mode power supply during start up in accordance with another embodiment of the present invention.

Soft start for threshold signal Vk may be employed to avoid shoot-through during start up. FIG. 7 shows waveforms illustrating signals of switching mode power supply 300 during start up in accordance with another embodiment of the present invention. When the synchronous rectifying control circuit is start up to provide an effective drive signal DRV for a first time at time T7, threshold signal Vk increases to a higher value rapidly, and then decreases gradually to a normal preset value. Secondary switch M1 may be turned OFF in advance per increasing of threshold signal Vk to avoid a possible shoot-through.

Figure 8:
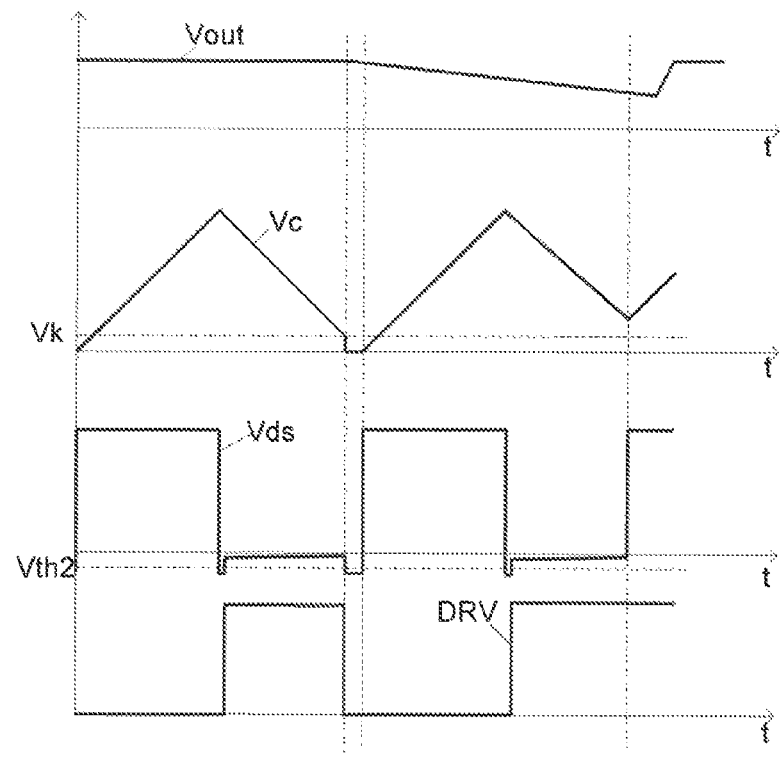
FIG. 8 shows waveforms illustrating signals of a switching mode power supply during load stepping up in accordance with an embodiment of the present invention.

FIG. 8 shows waveforms illustrating signals of a switching mode power supply during load stepping up in accordance with an embodiment of the present invention. Volt-seconds balance of transformer T1 is disturbed when output signal Vout decreases during load stepping up, per voltage Vsec increases and the falling slope of integrating signal Vc decreases. As a result, primary switch M2 may be turned ON before integrating signal Vc decreases less than threshold signal Vk, and shoot-through between primary switch M2 and secondary switch M1 may occur.

Figure 9:
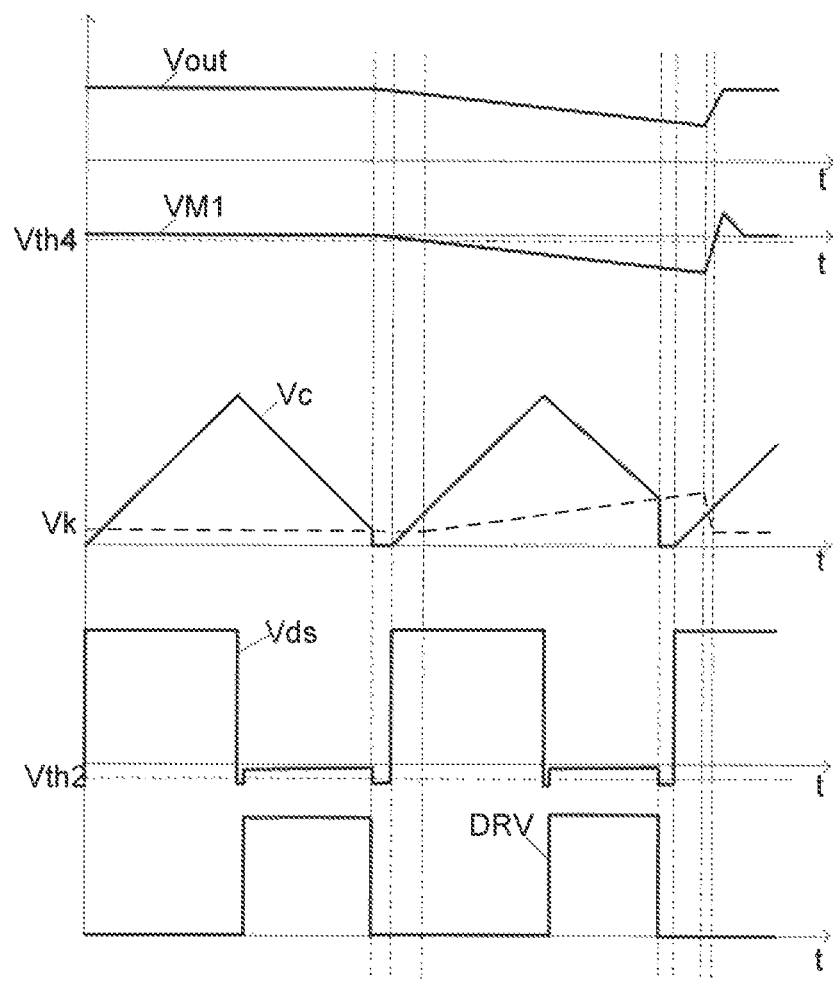
FIG. 9 shows waveforms illustrating signals of a switching mode power supply during load stepping up in accordance with another embodiment of the present invention.

Threshold signal Vk may increase to avoid shoot-through during load stepping up when output signal Vout decreases. FIG. 9 shows waveforms illustrating signals of switching mode power supply 300 during load stepping up in accordance with another embodiment of the present invention. Threshold signal Vk increases when output signal Vout decreases, and threshold signal Vk comes back to a preset normal value when output signal Vout maintains normal. The increased threshold signal Vk may be configured to turn OFF secondary switch M1 in advance to avoid a possible shoot-through.

Figure 10:
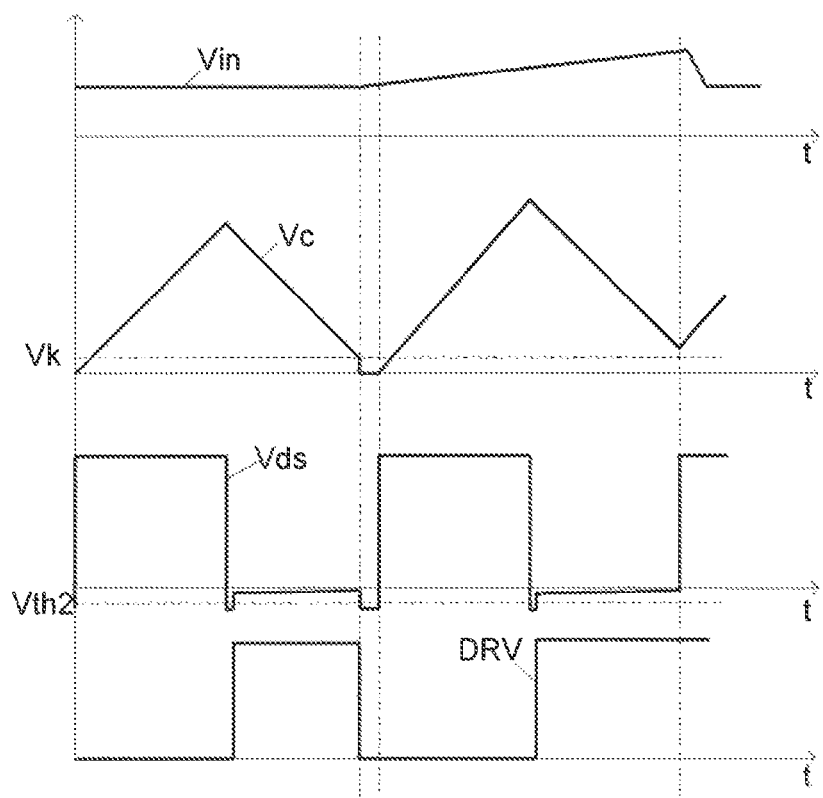
FIG. 10 shows waveforms illustrating signals of a switching mode power supply with varying input voltage in accordance with an embodiment of the present invention.

FIG. 10 shows waveforms illustrating signals of switching mode power supply 300 with varying input voltage in accordance with an embodiment of the present invention. The rising slope of integrating signal Vc increases with increasing of input signal Vin to disturb volt-seconds balance of transformer T1. Per superfluous increase of integrating signal Vc, primary switch M2 is turned ON before integrating signal Vc decreases less than threshold signal Vk, and shoot-through between primary switch M2 and secondary switch M1 may occur. Threshold signal Vk may increase to avoid shoot-through when input signal Vin increases. Secondary switch 111 may be turned OFF in advance per increasing of threshold signal Vk to avoid a possible shoot-through.

In one embodiment, when a duty cycle of primary switch M2 increases, i.e., an ON time period of primary switch M2 increases, rising time period of integrating signal Vc increases accordingly to disturb volt-seconds balance of transformer T1. Per superfluous increase of integrating signal Vc, primary switch M2 is turned ON before integrating signal Vc decreases less than threshold signal Vk, and shoot-through between primary switch M2 and secondary switch M1 may occur. Threshold signal Vk may increase to avoid shoot-through when the duty cycle of primary switch M2 increases. Threshold signal Vk may be adjusted based on circuit parameters, such as output signal Vout, input signal Vin, and the duty cycle of primary switch M2. In one embodiment, adjusting threshold signal Vk may comprises several steps, such as sampling and detecting a variation of a circuit parameter and adjusting threshold signal Vk based on the variation.

Figure 11:
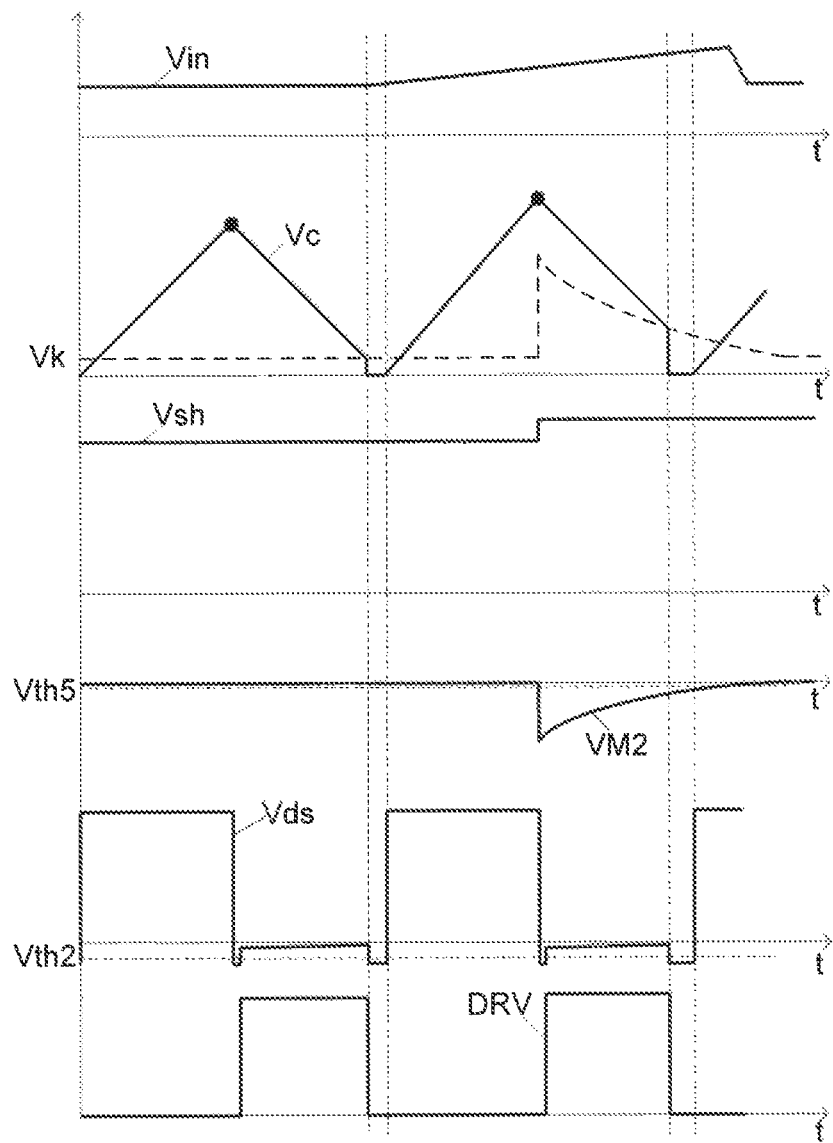
FIG. 11 shows waveforms illustrating signals of a switching mode power supply with varying input voltage in accordance with another embodiment of the present invention.

An isolated circuit may be needed to sampling input signal Vin or the duty cycle of primary switch M2. In one embodiment, a sample and hold circuit sampling a peak value of integrating signal Vc is employed to adjust threshold signal Vk and to avoid use of isolated circuit. FIG. 11 shows waveforms illustrating signals of a switching mode power supply with varying input voltage in accordance with another embodiment of the present invention. A sample-hold signal Vsh indicates peak value of integrating signal Vc. Threshold signal Vk increases when sample-hold signal Vsh increases, and threshold signal Vk comes back to the normal preset value when sample-hold signal Vsh maintains normal, Signal VM2 indicates a variation of sample-hold signal Vsh. Secondary switch M1 may be turned OFF in advance per increasing of threshold signal Vk to avoid a possible shoot-through.

Figure 12:
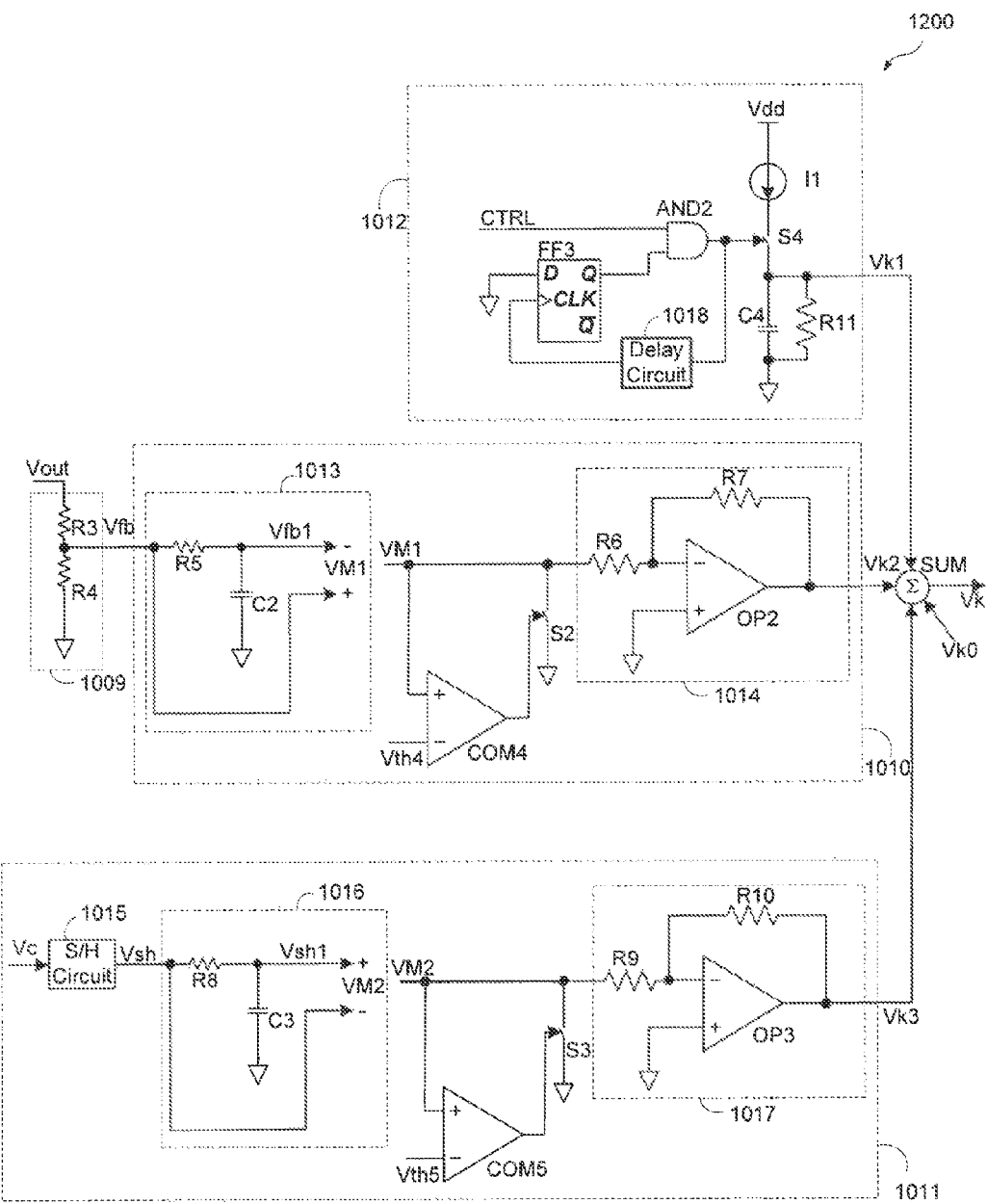
FIG. 12 schematically illustrates a threshold generating circuit in accordance with an embodiment of the present invention.

FIG. 12 schematically illustrates a threshold generating circuit 1200 in accordance with an embodiment of the present invention. Threshold generating circuit 1200 comprises a voltage sampling circuit 1009, a threshold adjusting circuit 1010, a threshold adjusting circuit 1011, a threshold start up circuit 1012 and an adder SUM. Voltage sampling circuit 1009 is configured to receive output signal Vout and provide a feedback signal Vfb accordingly. In one embodiment, voltage sampling circuit 1009 comprises a voltage divider having a resistor R3, and a resistor R4. Threshold adjusting circuit 1010 comprises an input configured to receive feedback signal Vfb, and an output configured to provide a threshold signal Vk2 responsive to feedback signal Vfb. Threshold adjusting circuit 1011 comprises an input configured to receive integrating signal Vc, and an output configured to provide a threshold signal Vk3. In one embodiment, threshold signal Vk3 is responsive to peak value of integrating signal Vc. Threshold start up circuit 1012 comprises an input configured to receive control signal CTRL, and an output configured to provide a threshold signal Vk1. Adder SUM is configured to provide threshold signal Vk via adding a threshold signal Vk0, threshold signal Vk1, threshold signal Vk2 and threshold signal Vk3 together. In one embodiment, threshold signal Vk0 is a constant value, e.g., 20 mV.

Threshold adjusting circuit 1010 comprises a variation detecting circuit 1013 and a proportional circuit 1014. Variation detecting circuit 1013 is configured to receive feedback signal Vfb and provide a variation signal VM1 between feedback signal Vfb and a delayed signal WM, Delayed signal Vfb1 is generated by feedback signal Vfb through a delay circuit. In one embodiment, the delay circuit comprises a resistor R5 and a capacitor C2. One end of resistor R5 is configured to receive feedback signal Vfb, the other end of resistor R5 is coupled to one end of capacitor C2, and the other end of capacitor C2 is coupled to the secondary system ground. Signal at a common node of resistor R5 and capacitor C2 represents delayed signal Vfb1. Proportional circuit 1014 is configured to receive variation signal VM1 and provide threshold signal Vk2 which is proportional to variation signal VM1. In one embodiment, proportional circuit 1014 comprises a resistor R6, a resistor R7 and an amplifier OP2. In one embodiment, threshold adjusting circuit 1010 may further comprise a switch S2 and a comparator COM4. Switch S2 comprises a first terminal configured to receive variation signal VM1, a second terminal coupled to the secondary system ground, and a control terminal. Comparator COM4 comprises an inverting terminal configured to receive a threshold signal Vth4, a non-inverting terminal configured to receive variation signal VM1 and an output coupled to the control terminal of switch S2. In one embodiment, switch S2 is turned ON to pull down variation signal VM1 when variation signal VM1 is larger than threshold signal Vth4. In one embodiment, threshold signal Vth4 is about zero volts.

Threshold adjusting circuit 1011 comprising a sample-hold circuit 1015, a variation detecting circuit 1016, and a proportional circuit 1017. Sample-hold circuit 1015 comprises an input configured to receive integrating signal Vc and an output configured to provide a sample-hold signal Vsh via sampling integrating signal Vc when secondary switch M1 becomes turned ON, e.g., when voltage Vds decreases to less than threshold signal Vth2 and integrating signal vc is larger than threshold signal Vk. Variation detecting circuit 1016 is configured to receive sample-hold signal Vsh and provide a variation signal VM2 between sample-hold signal Vfsh and a delayed signal Vsh1, Delayed signal Vsh1 is generated by sample-hold signal Vsh through a delay circuit. In one embodiment, the delay circuit comprises a resistor R8 and a capacitor C3. One end of resistor R8 is configured to receive sample-hold signal Vsh, the other end of resistor R8 is coupled to one end of capacitor C3, and the other end of capacitor C3 is coupled to the secondary system ground. Signal at a common node of resistor R8 and capacitor C3 represents delayed signal Vsh1. Proportional circuit 1017 is configured to receive variation signal VM2 and provide threshold signal Vk3 which is proportional to variation signal VM2. In one embodiment, proportional circuit 1017 comprises a resistor R9, a resistor R10 and an amplifier OP3. In one embodiment, threshold adjusting circuit 1011 may further comprise a switch S3 and a comparator COM5. Switch S3 comprises a first terminal configured to receive variation signal VM2, a second terminal coupled to the secondary system ground, and a control terminal. Comparator COM5 comprises an inverting terminal configured to receive a threshold signal Vth5, a non-inverting terminal configured to receive variation signal VM2 and an output coupled to the control terminal of switch S3. In one embodiment, switch 53 is turned ON to pull down variation signal VM2 when variation signal VM2 is larger than threshold signal Vth5. In one embodiment, threshold signal Vth5 is about zero volts.

Threshold start up circuit 1012 comprises a current source I1, a switch S4, a capacitor C4, a resistor R11, a D type flip-flop FF3, a delay circuit 1018, and an AND gate AND2. Current source I1 comprises an input and an output configured to provide a current. The input of current source I1 may coupled to a voltage Vdd. Switch S4 comprises a first terminal coupled to the output of current source I1, a second terminal coupled to a first terminal of capacitor C4 and a control terminal. A second terminal of capacitor C4 is coupled to the secondary system ground. Resistor R11 comprises a first terminal coupled to the first terminal of capacitor C4, and a second terminal coupled to the second terminal of capacitor C4. D type flip-flop FF3 comprises an input D coupled to the secondary system ground, a clock input CLK, and an output Q. AND gate AND comprises a first input coupled to receive control signal CTRL, a second input coupled to output Q of D type flip-flop FF3, and an output. Delay circuit 1018 comprises an input coupled to the output of AND gate AND2, and an output coupled to clock input CLK of D type flip-flop FF3. In one embodiment, an initial value at output Q of D type flip-flop FF3 is logic HIGH. When control signal CTRL becomes HIGH for the first time, secondary switch M1 is turned ON, and switch S4 is turned ON by control signal CTRL via AND gate AND2. Capacitor C4 is charged quickly to voltage Vdd via current source I1. In one example, voltage Vdd is about 50 mV. Switch S4 is turned OFF via D type flip-flop FF3 and AND gate AND after a delay time period introduced via delay circuit 1018. Capacitor C4 is discharged gradually to about zero volts via resistor R11. Voltage at the first terminal of capacitor C4 is threshold signal Vk1.

Figure 13:
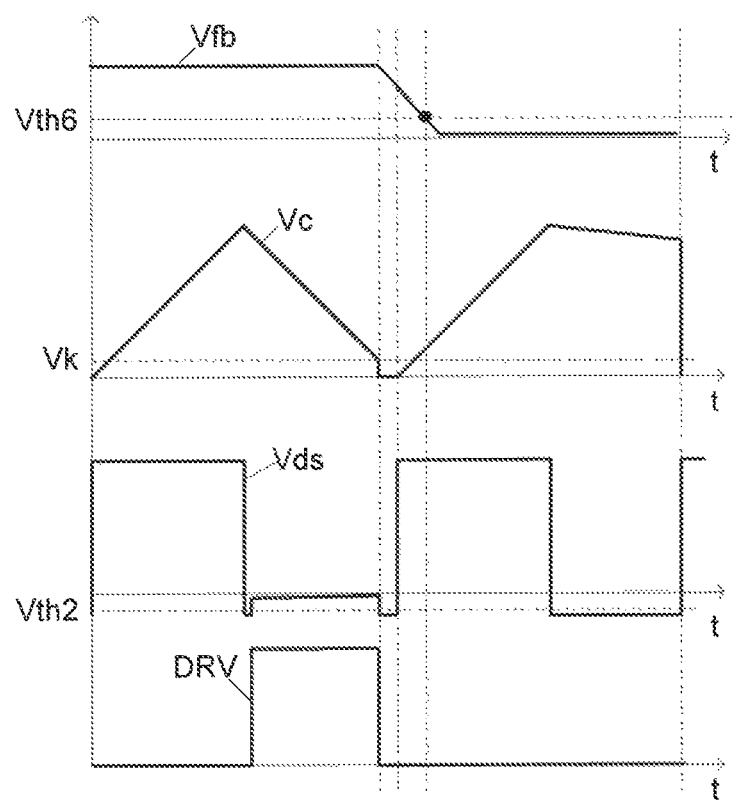
FIG. 13 shows waveforms illustrating signals of a switching mode power supply when output short circuit occurs in accordance with an embodiment of the present invention.

In one embodiment, when output short circuit occurs on switching mode power supply 300, output signal Vout decreases and voltage Vsec increases during secondary switch M1 is turned ON, and shoot-through may occur per integrating signal Vc may not decrease to less than Vk within a time period. To avoid the possible shoot-through, logic circuit 303 shown in FIG. 3 may be configured to turn OFF secondary switch M1 when output short circuit occurs. FIG. 13 shows waveforms illustrating signals of a switching mode power supply when output short circuit occurs in accordance with an embodiment of the present invention. When feedback signal Vfb is less than a threshold signal Vth6, it indicates that output short circuit occurs, and secondary switch 111 is turned OFF and/or latched OFF via logic circuit 303. In one example, threshold signal Vth6 is about 100 mV.

A resonance may occur between a magnetizing inductance of transformer T1 and a parasitic capacitance of primary switch M2 at current discontinuous conduction mode when energy stored in transformer T2 is all transferred to secondary side, and a resonant current may flow through the secondary winding of transformer T1. Per the resonant current, integrating signal Vc may be positive when primary switch M2 is turned ON, and a time integrating signal Vc decreases to less than threshold signal Vk may be postponed to cause a possible shoot-through. To avoid the possible shoot-through at current discontinuous conduction mode, when voltage Vsec is larger than output signal Vout, it indicates that primary switch is turned ON.

Figure 14:
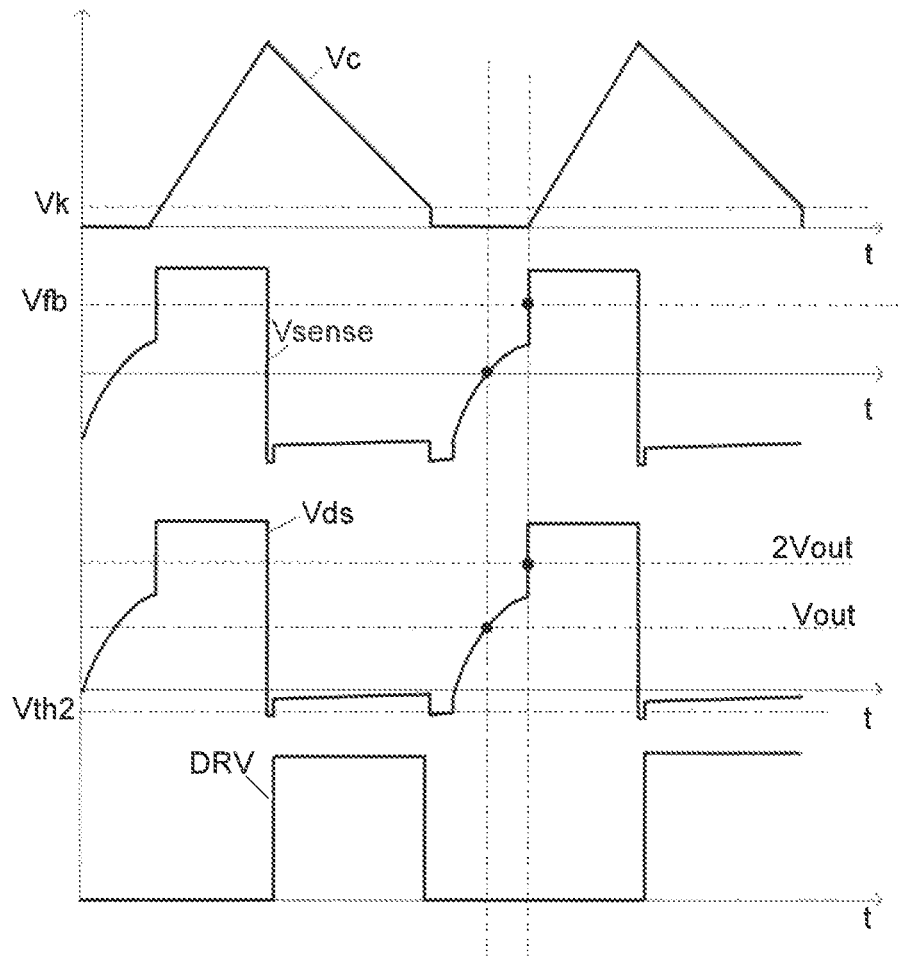
FIG. 14 shows waveforms illustrating signals of a switching mode power supply at current discontinuous conduction mode in accordance with an embodiment of the present invention.

Capacitor C1 is discharged to about zero volts to avoid possible shoot-through at current discontinuous conduction mode when integrating signal Vc is less than threshold signal Vk. Integrating Vc is discharged to zero volts until voltage Vsec is larger than output signal Vout. FIG. 14 shows waveforms illustrating signals of a switching mode power supply at current discontinuous conduction mode in accordance with an embodiment of the present invention. In one embodiment, capacitor C1 is discharged when integrating signal Vc decreases less than threshold signal Vk, and integrating signal Vc is charged when voltage sampling signal Vsense is larger than feedback signal Vfb. In one embodiment, threshold signal Vth3 shown in FIG. 3 is feedback signal Vfb.

Figure 15:
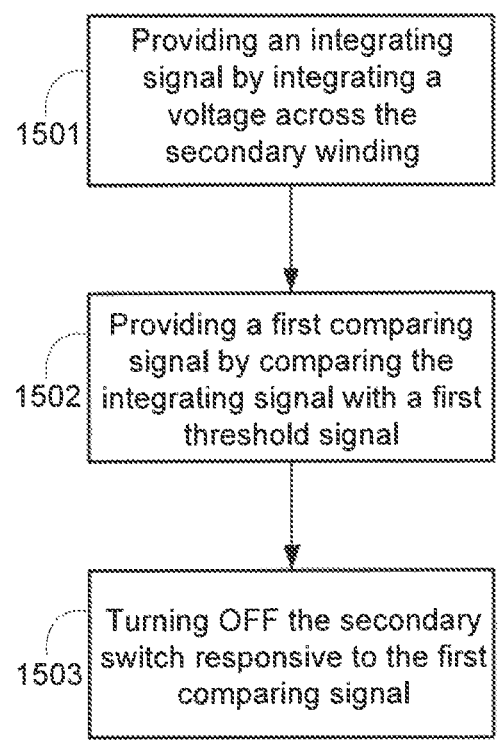
FIG. 15 is a flow chart illustrating a synchronous rectifying control method for a switching mode power supply in accordance with an embodiment of the present invention.

FIG. 15 is a flow chart illustrating a synchronous rectifying control method for a switching mode power supply in accordance with an embodiment of the present invention. The switching mode power supply comprises a primary circuit, a transformer having a primary winding and a secondary winding, and a secondary switch. The synchronous rectifying control method comprises stages 1501-1503.

At stage 1501, proving an integrating signal via integrating voltage across the secondary winding.

At stage 1502, providing a first comparing signal via comparing the integrating signal with a first threshold signal.

At stage 1503, turning OFF the secondary switch based on the first comparing signal. In one embodiment, secondary switch M1 is turned OFF when the integrating signal is less than the first threshold signal.

In one embodiment, the synchronous rectifying control method further comprises: providing a voltage sampling signal via sampling a voltage across the secondary winding; providing a first current signal based on the voltage sampling signal; and charging and discharging a first capacitor via the first current signal. A voltage across the first capacitor is the integrating signal.

In one embodiment, the synchronous rectifying control method further comprises: providing a second comparing signal via comparing a drain-source voltage of the secondary switch with a second threshold signal; and turning ON the secondary switch when the drain-source voltage of the secondary switch is less than the second threshold signal and the integrating signal is larger than the first threshold signal.

In one embodiment, the synchronous rectifying control method further comprises: increasing the first threshold signal to a higher value rapidly when the synchronous rectifying control circuit starts and secondary switch M1 is turned ON for a first time; and then decreasing the first threshold signal back to a preset constant value slowly.

In one embodiment, the synchronous rectifying control method further comprises: increasing the first threshold signal when an output signal of the switching mode power supply decreases; and decreasing the first threshold signal to the preset constant value when the output signal of the switching mode power supply comes back to normal.

In one embodiment, the synchronous rectifying control method further comprises: proving a sample-hold signal via sampling and holding a peak value of the integrating signal; and increasing the first threshold signal when the sample-hold signal increases, and maintaining the first threshold signal back to normal when the sample-hold signal maintains.

In one embodiment, the synchronous rectifying control method further comprises: decreasing the integrating signal to about zero volts when the integrating signal is less than the first threshold signal, and increasing the integrating signal when the voltage across the secondary winding is larger than a third threshold signal. In one embodiment, the third threshold signal is the output signal of the switching mode power supply.

In one embodiment, the synchronous rectifying control method further comprises: latching OFF the secondary switch when the output signal of the switching mode power supply is less than a fourth threshold signal.

The above description and discussion about specific embodiments of the present technology is for purposes of illustration. However, one with ordinary skill in the relevant art should know that the invention is not limited by the specific examples disclosed herein. Variations and modifications can be made on the apparatus, methods and technical design described above. Accordingly, the invention should be viewed as limited solely by the scope and spirit of the appended claims.

We claim:

1. A synchronous rectifying control circuit for a switching mode power supply, the switching mode power supply having an output configured to provide an output signal, wherein the switching mode power supply comprises a transformer having a primary winding and a secondary winding, and a secondary switch coupled to the secondary winding, and wherein the synchronous rectifying control circuit comprises:

an integrating circuit having a first input terminal, a second input terminal and an output terminal, wherein the first input terminal is coupled to a first terminal of the secondary winding, wherein the second input terminal is coupled to a second terminal of the secondary winding, and wherein the integrating circuit integrates the voltage across the secondary winding and generates an integrating signal at the output terminal;

a first comparison circuit having a first input terminal, a second input terminal and an output terminal, wherein the first input terminal is coupled to the output terminal of the integrating circuit to receive the integrating signal, wherein the second input terminal is configured to receive a first threshold signal, and wherein the first comparison circuit compares the integrating signal with the first threshold signal and generates a first comparing signal at the output terminal; and a logic circuit having a first input terminal and an output terminal, wherein the first input terminal is coupled to the output terminal of the first comparison circuit to receive the first comparing signal, the output terminal is coupled to a control terminal of the secondary switch, and wherein based on the first comparing signal, the logic circuit generates a control signal at the output terminal; and wherein the secondary switch is turned OFF when the integrating signal is less than the first threshold signal.

2. The synchronous rectifying control circuit of claim 1, further comprising:

a second comparison circuit having a first input terminal, a second input terminal and an output terminal, wherein the first input terminal is configured to receive a drain-source voltage of the secondary switch, wherein the second input terminal is configured to receive a second threshold signal, and wherein the second comparison circuit compares the drain-source voltage of the secondary switch with the second threshold signal and generates a second comparing signal at the output terminal; wherein the logic circuit further comprises a second input terminal, wherein the second input terminal is coupled to the output terminal of the second comparison circuit to receive the second comparing signal, and wherein the control signal is responsive to the second comparing signal; and wherein the secondary switch is turned ON when the drain-source voltage of the secondary switch is less than the second threshold signal and the integrating signal is larger than the first threshold signal.

3. The synchronous rectifying control circuit of claim 1, wherein the integrating circuit comprises:

a voltage sampling circuit configured to receive the voltage across the secondary winding, and configured to provide a voltage sampling signal;

a voltage to current conversion circuit having an input terminal and an output terminal, wherein the input terminal is coupled to the voltage sampling circuit to receive the voltage sampling signal, and wherein the output terminal is configured to provide a first current signal responsive to the voltage sampling signal; and a first capacitor having a first terminal and a second terminal, wherein the first terminal is coupled to the output terminal of the voltage to current conversion circuit to receive the first current signal and is configured to provide the integrating signal, the second terminal is coupled to a secondary ground.

4. The synchronous rectifying control circuit of claim 3, wherein the synchronous rectifying control circuit further comprises:
  a first switch, comprising a first terminal, a second terminal and a control terminal, wherein the first terminal is coupled to the first terminal of the first capacitor, and wherein the second terminal is coupled to the second terminal of the first capacitor, and wherein the second terminal is coupled to the second terminal of the first capacitor;
  a third comparison circuit, comprising a first input terminal, a second input terminal and an output terminal, wherein the first input terminal is coupled to the voltage sampling circuit to receive the voltage sampling signal, wherein the second input terminal is configured to receive a third threshold signal; and
  a RS trigger, comprising a set terminal, a reset terminal and an output terminal, wherein the set terminal is coupled to the output terminal of the first comparison circuit, wherein the reset terminal is coupled to the output terminal of the third comparison circuit, and wherein the output terminal is coupled to the control terminal of the first switch; and wherein
  the first switch is turned ON when the integrating signal is less than the first threshold signal, and the first switch is turned OFF when the voltage across the secondary winding is larger than the third threshold signal.

5. The synchronous rectifying control circuit of claim 4, wherein the third threshold signal is a feedback signal indicative of the output signal.

6. The synchronous rectifying control circuit of claim 1, wherein when the integrating signal is less than the first threshold signal, the integrating signal is decreased to about zero volts until the voltage across the secondary winding is larger than a third threshold signal.

7. The synchronous rectifying control circuit of claim 1, wherein the synchronous rectifying control circuit further comprising:
  a threshold start up circuit, having an input terminal and an output terminal, wherein the input terminal is coupled to the output terminal of the logic circuit, wherein the output terminal is configured to provide a first threshold varying signal;
  a first threshold adjusting circuit, having an input terminal and an output terminal, wherein the input terminal is coupled to the output of the switching mode power supply, and wherein the output terminal is configured to provide a second threshold varying signal;
  a second threshold adjusting circuit, having an input terminal and an output terminal, wherein the input terminal is coupled to the output terminal of the integrating circuit, and wherein the output terminal is configured to provide a third threshold varying signal; and
  an adder, having a first input terminal, a second input terminal, a third input terminal, a fourth input terminal and an output terminal, wherein the first input terminal is coupled to the output terminal of the threshold start up circuit, the second input terminal is coupled to the output terminal of the first threshold adjusting circuit, the third input terminal is coupled to the output terminal of the second threshold adjusting circuit, the fourth input terminal is coupled to a constant threshold signal, and the output terminal is configured to provide the first threshold signal, and wherein the first threshold signal is based on adding together the constant threshold signal, the first threshold varying signal, the second threshold varying signal, and the third threshold varying signal.

8. The synchronous rectifying control circuit of claim 7, wherein the first threshold adjusting circuit further comprising:
  a first variation detecting circuit, having an input terminal and an output terminal, wherein the input terminal is coupled to the output of the switching mode power supply; and
  a first proportional circuit, having an input terminal and an output terminal, wherein the input terminal is coupled to the output terminal of the first variation detecting circuit, and wherein the output terminal is configured to provide the second threshold varying signal.

9. The synchronous rectifying control circuit of claim 7, wherein the second threshold adjusting circuit further comprising:
  a second variation detecting circuit, having an input terminal and an output terminal, the input terminal is coupled to the output terminal of the integrating circuit; and
  a second proportional circuit, having an input terminal and an output terminal, wherein the input terminal is coupled to the output terminal of the second variation detecting circuit, and where the output terminal is configured to provide the third threshold varying signal.

10. The synchronous rectifying control circuit of claim 7, wherein the threshold start up circuit further comprising:
  a current source, having an output terminal configured to provide a second current signal;
  a second switch, having a first terminal, a second terminal and a control terminal, wherein the first terminal is coupled to the output terminal of the current source, wherein the control terminal is coupled to the output terminal of the logic circuit, and wherein when the control signal is activated for a first time, the second switch is configured to be turned ON within a time period;
  a second capacitor, having a first terminal and a second terminal, wherein the first terminal is coupled to the second terminal of the second switch; and
  a resistor, having a first terminal and a second terminal, wherein the first terminal is coupled to the first terminal of the second capacitor, and wherein the second terminal is coupled to the second terminal of the second capacitor.

11. A switching mode power supply, comprising:
  a primary circuit having an input terminal, a first output terminal and a second output terminal, wherein the input terminal is configured to receive an input signal, and wherein the primary circuit is configured to provide an AC signal between the first output terminal and the second output terminal;
  a transformer having a primary winding and a secondary winding, wherein the primary winding having a first terminal coupled to the first output terminal of the primary circuit, and a second terminal coupled to the second output terminal of the primary circuit, and wherein the secondary winding having a first terminal and a second terminal;
  a secondary switch, having a first terminal, a second terminal and a control terminal, wherein the first terminal is coupled to the secondary winding and the second terminal is coupled to a load; and
  a synchronous rectifying control circuit comprising:
    an integrating circuit having a first input terminal, a second input terminal and an output terminal, wherein the first input terminal is coupled to the first terminal of the secondary winding, wherein the second input terminal is coupled to the second terminal of the secondary winding, and wherein the integrating circuit integrates the voltage across the secondary winding and generates an integrating signal at the output terminal;

a first comparison circuit, having a first input terminal, a second input terminal and an output terminal, wherein the first input terminal is coupled to the output terminal of the integrating circuit to receive the integrating signal, wherein the second input terminal is configured to receive a first threshold signal, and wherein the first comparison circuit compares the integrating signal with the first threshold signal and generates a first comparing signal at the output terminal;

a second comparison circuit, having a first input terminal, a second input terminal and an output terminal, wherein the first input terminal is configured to receive a drain-source voltage of the secondary switch, wherein the second input terminal is configured to receive a second threshold signal, and wherein the second comparison circuit compares the drain-source voltage of the secondary switch and the second threshold signal and generates a second comparing signal at the output terminal; and a logic circuit, having a first input terminal, a second input terminal and an output terminal, wherein the first input terminal is coupled to the output terminal of the first comparison circuit, the second input terminal is coupled to the output terminal of the second comparison circuit, and the output terminal is coupled to the control terminal of the secondary switch to provide a control signal responsive to the first comparing signal and the second comparing signal; and wherein when the integrating signal is less than the first threshold signal, the secondary switch is turned OFF; and when the drain-source voltage of the secondary switch is less than the second threshold signal and the integrating signal is larger than the first threshold signal, the secondary switch is turned ON.

12. The switching mode power supply of claim 11, wherein the integrating circuit comprises:

a voltage sampling circuit configured to receive the voltage across the secondary winding, and configured to provide a voltage sampling signal;

a voltage to current conversion circuit having an input terminal and an output terminal, wherein the input terminal is coupled to the voltage sampling circuit to receive the voltage sampling signal, and wherein the output terminal is configured to provide a first current signal responsive to the voltage sampling signal; and a first capacitor, having a first terminal and a second terminal, wherein the first terminal is coupled to the output terminal of the voltage to current conversion circuit to receive the first current signal and is configured to provide the integrating signal, the second terminal is coupled to a secondary ground.

13. A synchronous rectifying control method for a switching mode power supply, the switching mode power supply having an output configured to provide an output signal, wherein the switching mode power supply comprises a transformer having a primary winding and a secondary winding, and a secondary switch coupled to the secondary winding, and wherein the synchronous rectifying control method comprises:

providing an integrating signal by integrating a voltage across the secondary winding;

comparing the integrating signal with a first threshold signal; and turning OFF the secondary switch when the integrating signal is less than the first threshold signal.

14. The synchronous rectifying control method of claim 13, further comprising:

comparing a drain-source voltage of the secondary switch with a second threshold signal; and turning ON the secondary switch when the drain-source voltage of the secondary switch is less than the second threshold signal and the integrating signal is larger than the first threshold signal.

15. The synchronous rectifying control method of claim 13, further comprising:

providing a voltage sampling signal via sampling the voltage across the secondary winding;

providing a first current signal responsive to the voltage sampling signal; and charging and discharging a first capacitor via the first current signal; and wherein the integrating signal comprises a voltage across the first capacitor.

16. The synchronous rectifying control method of claim 13, further comprising:

increasing the first threshold signal from a preset constant value at a rising rate when the synchronous rectifying control circuit starts and the secondary switch is turned ON for a first time; and decreasing the first threshold signal to the preset constant value at a falling rate; and wherein the rising rate is larger than the falling rate.

17. The synchronous rectifying control method of claim 13, further comprising increasing the first threshold signal from a preset constant value when the output signal decreases.

18. The synchronous rectifying control method of claim 13, further comprising:

providing a sample-hold signal via sampling and holding a peak value of the integrating signal; and increasing the first threshold signal when the sample-hold signal increases.

19. The synchronous rectifying control method of claim 13, further comprising:

decreasing the integrating signal to about zero volts when the integrating signal is less than the first threshold signal; and increasing the integrating signal when the voltage across the secondary winding is larger than the output signal.

20. The synchronous rectifying control method of claim 13, further comprising latching OFF the secondary switch when the output signal is less than a fourth threshold signal.

* * * * *